United States Patent
Minami

(10) Patent No.: US 6,484,495 B2
(45) Date of Patent: Nov. 26, 2002

(54) DEVICE FOR PURIFYING EXHAUST GAS OF DIESEL ENGINES

(75) Inventor: Toshitaka Minami, Kanagawa (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 10/015,775

(22) Filed: Dec. 17, 2001

(65) Prior Publication Data
US 2002/0073694 A1 Jun. 20, 2002

(30) Foreign Application Priority Data
Dec. 19, 2000 (JP) ......................................... 2000-384711

(51) Int. Cl.[7] ................................................. F01N 3/00
(52) U.S. Cl. ............................. 60/288; 60/285; 60/292; 60/297
(58) Field of Search ........................... 60/287, 288, 292, 60/295, 297, 285, 286

(56) References Cited

U.S. PATENT DOCUMENTS

| | | | | |
|---|---|---|---|---|
| 6,014,859 A | * | 1/2000 | Yoshiyaki et al. | 60/285 |
| 6,178,743 B1 | * | 1/2001 | Hirota et al. | 60/277 |
| 6,192,675 B1 | * | 2/2001 | Hirota et al. | 60/286 |
| 6,212,885 B1 | * | 4/2001 | Hirota et al. | 60/288 |
| 6,233,927 B1 | * | 5/2001 | Hirota et al. | 60/297 |

* cited by examiner

Primary Examiner—Thomas Denion
Assistant Examiner—Binh Tran
(74) Attorney, Agent, or Firm—Antonelli, Terry, Stout & Kraus, LLP

(57) ABSTRACT

A device for purifying exhaust gas of diesel engines, in which an oxidizing catalyst, a diesel particulate filter, and an Nox occluding/reducing catalyst are successively disposed in an exhaust gas passage of the diesel engine from the upstream side of the passage, the device for purifying exhaust gas of diesel engines comprising a bypass that connects the upstream side of the oxidizing catalyst with the downstream side thereof in the exhaust gas passage, an exhaust gas passage change-over means for changing-over the exhaust gas flow into either the oxidizing catalyst or the bypass, an air-fuel ratio control means for controlling the air-fuel ratio of the exhaust gas, an NOx occlusion amount detector means for detecting the amount of NOx occluded by the NOx occluding substance, and a controller. The controller controls the air-fuel ratio control means and the exhaust gas passage change-over means so that the exhaust gas having a lean air-fuel ratio flows into the oxidizing catalyst when the amount of NOx occluded by the NOx occluding substance does not reach a predetermined value, and so that the exhaust gas having a rich air-fuel ratio flows through the bypass when the amount of NOx occluded by the NOx occluding substance exceeds the predetermined value.

1 Claim, 3 Drawing Sheets

Fig. 3
(a)
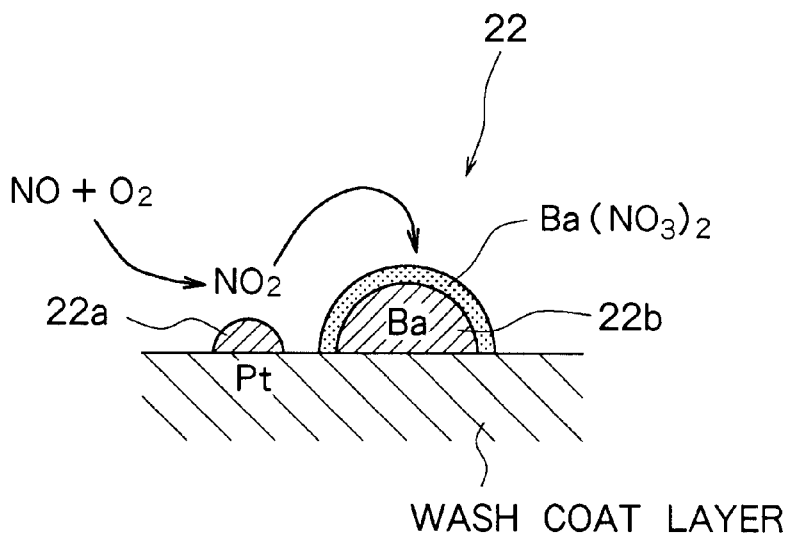
(b)
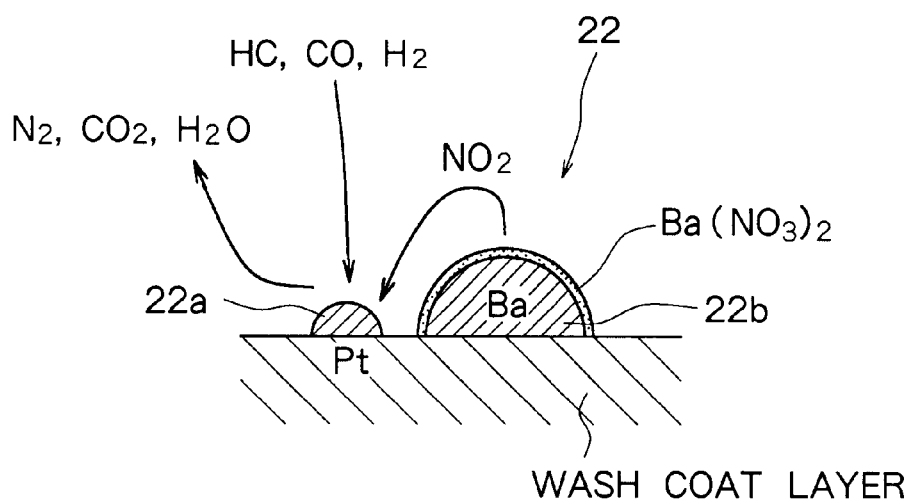

DEVICE FOR PURIFYING EXHAUST GAS OF DIESEL ENGINES

FIELD OF THE INVENTION

The present invention relates to a device for purifying exhaust gas of diesel engines and, more particularly, to a device for purifying exhaust gas by removing particulate matters and nitrogen oxides from the exhaust gas.

DESCRIPTION OF THE PRIOR ART

Vehicles mounting diesel engines have a serious problem of reducing particulate matters (hereinafter referred to as PMs) and nitrogen oxides (hereinafter referred to as NOx) contained in the exhaust gas emitted from the diesel engines. In order to decrease PMs and NOx, attempts have been made to remove PMs and NOx by an after-treatment system in addition to suppressing the generation of PMs and NOx by improving the combustion by means of a high-pressure injection and exhaust gas recirculation system (hereinafter referred to as EGR).

As a device for removing PMs, there has been known a diesel particulate filter (hereinafter referred to as DPF). The DPF is constituted by a porous honeycomb or a felted ceramic fiber, and traps PMs contained in the exhaust gas. The trapped PMs are continuously burned with $NO_2$ formed by oxidizing the NO in the exhaust gas through an oxidizing catalyst disposed on the upstream of the DPF. The so-called continuous regeneration type DPF which continuously regenerates the DPF by utilizing the oxidizing catalyst permits the PM to burn at a temperature which is as low as 400° C. or lower. Hence, it offers an advantage in that the entire apparatus can be simply and compactly fabricated as compared to the regeneration of the DPF by heating using an electric heater or the like.

Further, an Nox-reducing catalyst has been known as a device for removing NOx. In order to reduce the NOx by using the NOx-reducing catalyst, however, the exhaust gas must be rendered to be a reducing atmosphere at all times. In the case of a diesel engine which emits the exhaust gas creating an oxygen-rich atmosphere, it is necessary to continuously inject the fuel that does not contribute to increasing the engine output, by executing a so-called post injection (injection in a very small amount in the latter half of the combustion stroke), so that the exhaust gas is rendered to be a reducing atmosphere. This, however, causes a problem of making fuel consumption worse.

Under the circumstances, a study has been made on a so-called NOx occluding/reducing catalyst which occludes NOx when the exhaust gas has a lean air-fuel ratio and releases the occluded NOx to reduce it into $N_2$ when the exhaust gas has a rich air-fuel ratio. The NOx occluding/reducing catalyst has a constitution that an Nox occluding substance and a catalytically active component which are carried on a carrier, and it oxidizes the NOx in the exhaust gas on the catalytically active component so as to allow the NOx occluding substance to occlude NOx when the exhaust gas has a lean air-fuel ratio, i.e., when the exhaust gas is an oxidizing atmosphere, and releases the NOx occluded by the NOx occluding substance to reduce the Nox to $N_2$ on the catalytically active component by using HC and CO in the exhaust gas as reducing agents when the exhaust gas has a rich air-fuel ratio, i.e., when the exhaust gas is a reducing atmosphere. By using the NOx occluding/reducing catalyst as described above, the exhaust gas may be rendered to be a reducing atmosphere only when the NOx occluded by the NOx occluding substance is released to be reduced, giving advantage of superior fuel consumption property to that of the conventional NOx-reducing catalyst.

By furnishing a diesel engine with the above-mentioned continuous regeneration type DPF utilizing the oxidizing catalyst and with the NOx occluding/reducing catalyst, it is allowed to remove PMs and NOx from the exhaust gas simultaneously. Devices for purifying exhaust gas of diesel engines equipped with such devices have been disclosed in, for example, Japanese Laid-open Patent Publication (Kokai) Nos. 53442/1997 (JP-A 9-53442) and 137716/1997 (JP-A 9-137716).

By the way, when the diesel engine is furnished with the DPF of the continuous regeneration type utilizing the oxidizing catalyst and with the NOx occluding/reducing catalyst, it is necessary that these devices are arranged in order of the oxidizing catalyst, DPF and NOx occluding/reducing catalyst from the upstream side of the exhaust gas passage, since NO is formed at the time when the PMs burn on the DPF. Therefore, the exhaust gas passes through the oxidizing catalyst prior to passing through the NOx occluding/reducing catalyst. Here, even when the exhaust gas having a rich air-fuel ratio passes through the oxidizing catalyst, the HC and CO in the exhaust gas are oxidized to $CO_2$ and $H_2O$ due to the presence of oxygen in the exhaust gas though its amount may be small. Therefore, when the oxidizing catalyst is disposed on the upstream side of the NOx occluding/reducing catalyst, the HC and CO which are the reducing agents are not supplied in sufficient amounts to the NOx occluding/reducing catalyst when the NOx is to be reduced through the NOx occluding/reducing catalyst by enriching the air-fuel ratio of the exhaust gas. Accordingly, the NOx released from the NOx occluding substance is not reduced but is directly emitted into the atmosphere.

SUMMARY OF THE INVENTION

It is an object of the present invention to provide a device for purifying exhaust gas of diesel engines, which is capable of reliably removing the PMs and NOx by furnishing the diesel engines with a DPF of the continuous regeneration type utilizing an oxidizing catalyst and with an NOx occluding/reducing catalyst.

In order to accomplish the above-mentioned object according to the present invention, there is provided a device for purifying exhaust gas of diesel engines, in which an oxidizing catalyst, a diesel particulate filter for trapping particulate matters contained in the exhaust gas, and an NOx occluding/reducing catalyst comprising an NOx occluding substance and a catalytically active component, are successively arranged in an exhaust gas passage of the diesel engine from the upstream side of the passage, said device for purifying exhaust gas of diesel engines comprising:

a bypass that connects the upstream side of said oxidizing catalyst with the downstream side thereof in said exhaust gas passage to bypass said oxidizing catalyst;

an exhaust gas passage change-over means for changing-over the exhaust gas flow to either said oxidizing catalyst or said bypass;

an air-fuel ratio control means for controlling the air-fuel ratio of the exhaust gas;

an NOx occlusion amount detector means for detecting the amount of NOx occluded by said NOx occluding substance; and a controller for controlling said air-fuel ratio control means and said exhaust gas passage change-over means based on a detection signal from said NOx occlusion amount detector means;

wherein said controller controls said air-fuel ratio control means so that the exhaust gas will have a lean air-fuel ratio and controls said exhaust gas passage change-over means so that the exhaust gas will flow through said oxidizing catalyst when the amount of NOx occluded by said NOx occluding substance does not reach a predetermined value, and controls said air-fuel ratio control means so that the exhaust gas will have a rich air-fuel ratio and controls said exhaust gas passage change-over means so that the exhaust gas will flow through said bypass when the amount of NOx occluded by said NOx occluding substance exceeds the predetermined value.

BRIEF DESCRIPTION OF THE DRAWINGS

FIG. 3 is a diagram schematically illustrating (a) an NOx occluding mechanism of when the exhaust gas has a lean air-fuel ratio and (b) an Nox reducing mechanism of when the exhaust gas has a rich air-fuel ratio in the NOx occluding/reducing catalyst.

DETAILED DESCRIPTION OF THE PREFERRED EMBODIMENTS

An embodiment of the invention will now be described with reference to the drawings.

Figure 1:
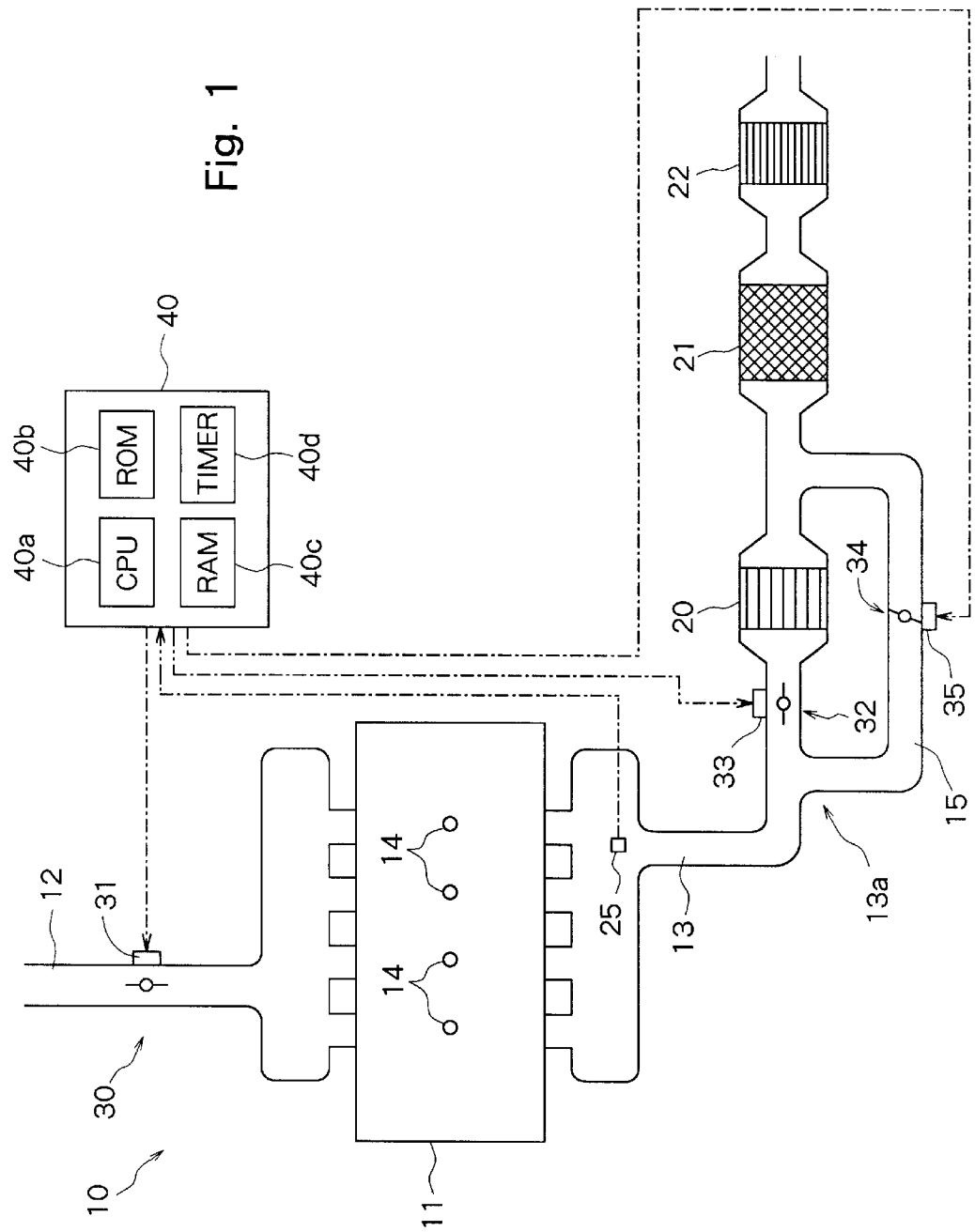
FIG. 1 is a diagram illustrating the constitution of a device for purifying exhaust gas of diesel engines according to an embodiment of the present invention.

FIG. 1 is a diagram illustrating the constitution of a device for purifying exhaust gas of diesel engines according to an embodiment of the present invention. A diesel engine 10 in FIG. 1 comprises an engine body 11 constituted by a cylinder block and a cylinder head, an intake air passage 12 for introducing the air into the cylinders formed in the engine body 11, and an exhaust gas passage 13 for emitting the exhaust gas from the cylinders of the engine body 11. In the engine body 11 are disposed fuel injection nozzles 14 for injecting fuel into the combustion chambers that are not shown.

In the exhaust gas passage 13, there are successively disposed an oxidizing catalyst 20, a DPF 21 and an Nox occluding/reducing catalyst 22 from the upstream side thereof. These devices will now be described in detail.

The oxidizing catalyst 20 is obtained by coating the surfaces of a carrier of, for example, honeycomb-like cordierite or a heat-resistant steel with active alumina to form a wash coat layer, and carrying a catalytically active component which is a novel metal such as platinum, palladium or rhodium on the wash coat layer. When the exhaust gas is passed through the thus constituted oxidizing catalyst 20, the NO in the exhaust gas is oxidized to form $NO_2$ when the exhaust gas has a lean air-fuel ratio, but is not oxidized when the exhaust gas has a rich air-fuel ratio. The HC and CO in the exhaust gas are oxidized to form $H_2O$ and $CO_2$ in both the cases where the exhaust gas has a lean air-fuel ratio or a rich air-fuel ratio.

In this specification, the air-fuel ratio of the exhaust gas represents a ratio of the amount of air in the exhaust gas flowing through the exhaust gas passage 13 to the amount of fuel (hydrocarbons) therein. If neither the air nor the fuel is newly supplied to the exhaust gas emitted by the combustion in the combustion chambers of the engine body 11, the air-fuel ratio of the exhaust gas becomes equal to a ratio of the amount of the air taken in by the cylinders in the engine body 11 to the amount of fuel injected from the fuel injection nozzles 14. Therefore, the exhaust gas having an air-fuel ratio (e.g., air-fuel ratio of 30) leaner than the stoichiometric air-fuel ratio acquires an increased oxygen concentration to create an oxidizing atmosphere. Conversely, the exhaust gas having an air-fuel ratio (e.g., air-fuel ratio of 13) richer than the stoichiometric air-fuel ratio acquires increased HC and CO concentrations to create a reducing atmosphere.

As the DPF 21, there is used a so-called wall flow-type honeycomb filter in which many cells are formed in parallel with, for example, porous cordierite or silicon carbide and the inlets and outlets of the cells are alternately closed, or a so-called fiber type filter obtained by winding felted ceramic fibers in many layers on a stainless steel porous tube. When the exhaust gas is passed through the thus constituted DPF 21, the PMs in the exhaust gas are trapped by the DPF 21. When the exhaust gas has a lean air-fuel ratio, the PMs trapped by the DPF 21 undergo the chemical reactions,

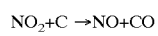

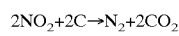

due to the $NO_2$ formed by the oxidizing catalyst 20, and are oxidized (burned) into CO or $CO_2$. The above-mentioned reactions, however, do not take place unless the temperature of the exhaust gas exceeds a predetermined temperature (e.g., 250° C.). In a region of small loads and low speeds inclusive of the engine idling operation, the temperature of the exhaust gas becomes not higher than 250° C. When the diesel engine 10 enters into such an operation region, therefore, it happens that the PMs trapped by the DPF 21 are not burned. When the temperature of the exhaust gas becomes lower than the predetermined temperature, therefore, the amount of the air taken in by the cylinders of the engine body 11 is decreased by using an intake throttle that will be described later, to raise the temperature of the exhaust gas. When the exhaust gas has a rich air-fuel ratio, on the other hand, no $NO_2$ is formed by the oxidizing catalyst 20, and the PMs trapped by the DPF 21 are not almost burned.

The NOx occluding/reducing catalyst 22 is the same as, for example, the above-mentioned oxidizing catalyst 20 which is obtained by coating the surfaces of a carrier of, for example, honeycomb-like cordierite or a heat-resistant steel with active alumina to form a wash coat layer, carrying a catalytically active component which is a novel metal such as platinum, palladium or rhodium on the wash coat layer and further, carrying an Nox occluding substance which is a basic substance such as barium or potassium on the wash coat layer.

Described below with reference to FIG. 3 is a mechanism of occluding and reducing the NOx in the exhaust gas when it is passed through the thus constituted NOx occluding/reducing catalyst 22. In FIG. 3, there are illustrated a mechanism for occluding the NOx (FIG. 3(a)) when the exhaust gas has a lean air-fuel ratio and a mechanism for reducing the NOx when the exhaust gas has a rich air-fuel ratio, by using the NOx occluding/reducing catalyst 22 that contains platinum (Pt) as a catalytically active component 22a and barium (Ba) as an Nox occluding substance 22b. When the exhaust gas has a lean air-fuel ratio as shown in FIG. 3(a), the NO constituting most of the NOx in the exhaust gas is oxidized on platinum with oxygen ($O_2$) to $NO_2$ and then, bonds with barium and is occluded by barium as a nitrate $Ba(NO_3)_2$. When the exhaust gas has a rich air-fuel ratio as shown in FIG. 3(b), on the other hand, the nitrate $Ba(NO_3)_2$ occluded by barium is decomposed into $NO_2$, which is then, released therefrom and is reduced into $N_2$ on platinum by the reducing agents such as HC and CO in the exhaust gas. By the above mechanisms, the NOx occluding/reducing catalyst 22 removes the NOx from the exhaust gas. In reducing the NOx, the HC and CO in the exhaust gas work as reducing agents and are oxidized into $CO_2$ and $H_2O$. Therefore, the NOx occluding and reducing catalyst 22 removes the NOx as well as HC and CO at the same time.

The exhaust gas passage 13 is provided with a bypass 15 that connects the upstream side of the oxidizing catalyst 20 to the downstream side thereof to bypass the oxidizing catalyst 20. Further, an exhaust gas passage opening/closing valve 32 is disposed in the exhaust gas passage 13 between the oxidizing catalyst 20 and a connection portion 13a at which the bypass 15 is connected to the upstream of the oxidizing catalyst 20. The exhaust gas passage opening/closing valve 32 is opened and closed by an actuator 33 of the negative pressure type. The actuator 33 opens and closes the exhaust gas passage opening/closing valve 32 by a negative pressure introduced into a negative pressure chamber from a vacuum pump that is not shown. The bypass 15 further includes a bypass opening/closing valve 34 which is opened and closed by an actuator 35 of the negative pressure type, like the exhaust gas passage opening/closing valve 32.

With the exhaust gas passage opening/closing valve 32 and the bypass opening/closing valve 34 being disposed as described above, it becomes possible to flow the exhaust gas emitted from the cylinders of the engine body 11 into either the oxidizing catalyst 20 or the bypass 15. That is, with the exhaust gas passage opening/closing valve 32 being opened and the bypass opening/closing valve 34 being closed, the exhaust gas flows through the oxidizing catalyst 20 but does not flow into the bypass 15. Conversely, with the exhaust gas passage opening/closing valve 32 being closed and the bypass opening/closing valve 34 being opened, the exhaust gas flows into the bypass 15 but does not flow through the oxidizing catalyst 20. In the illustrated embodiment as described above, the exhaust gas passage opening/closing valve 32 and the bypass opening/closing valve 34 work as exhaust gas passage change-over means that changes over the exhaust gas to flow into either the oxidizing catalyst 20 or the bypass 15. In the exhaust gas passage 13 is disposed an exhaust gas temperature sensor 25 that detects the temperature of the exhaust gas emitted from the cylinders of the engine body 11. A signal detected by the exhaust gas temperature sensor 25 is input to a controller 40 that will be described later.

In the intake air passage 12 is disposed an intake air throttle valve 30 which adjusts an amount of the air taken in into the cylinders formed in the engine body 11. The opening angle of the intake air throttle valve 30 is adjusted by an actuator 31 of the negative pressure type. The actuator 31 adjusts the opening angle of the intake air throttle valve 30 by adjusting the proportion of negative pressure introduced into the negative pressure chamber from a vacuum pump that is not shown. By disposing the intake air throttle valve 30 in the intake air passage 12 as described above, it becomes possible to control the air-fuel ratio of the exhaust gas. That is, when the intake air throttle valve 30 is fully opened, the combustion takes place in the combustion chambers of the engine body 11 in an air (oxygen)-rich atmosphere under ordinary diesel combustion conditions, and the air-fuel ratio of the exhaust gas becomes lean (e.g., air-fuel ratio of 30). When the intake air throttle valve 30 is narrowed down, on the other hand, an amount of the air taken in into the cylinders of the engine body 11 decreases, whereby the combustion takes place in the combustion chambers in an air-deficient state and the air-fuel ratio of the exhaust gas becomes rich (e.g., air-fuel ratio of 13 when the opening angle of the intake air throttle valve 30 is 1/10). According to the illustrated embodiment as described above, the intake air throttle valve 30 works as an air-fuel ratio control means for controlling the air-fuel ratio of the exhaust gas.

Further, the intake air throttle valve 30 is also capable of controlling the temperature of the exhaust gas. That is, when the intake air throttle valve 30 is narrowed down, a decreased amount of the air is taken in into the cylinders of the engine body 11, and the temperature of the exhaust gas rises. The temperature to be raised is controlled in compliance with the opening angle of the intake air throttle valve 30. Thus, by narrowing the intake air throttle valve 30 down as described above, the air-fuel ratio of the exhaust gas can be enriched and the temperature of the exhaust gas can be further raised. Here, if the intake air throttle valve 30 is narrowed down in a range in which the air-fuel ratio of the exhaust gas does not become rich (e.g., the air-fuel ratio becomes from 20 to 30 when the intake air throttle valve 30 is opened by ½ to full throttle), the temperature of the exhaust gas can be raised while keeping the air-fuel ratio of the exhaust gas lean.

The device for purifying exhaust gas of the diesel engine 10 has a controller 40 for controlling the intake air throttle valve 30, the exhaust gas passage opening/closing valve 32 and the bypass opening/closing valve 34. The controller 40 comprises a central processing unit (CPU) 40a for executing a variety of operation programs, a read-only memory (ROM) 40b storing a variety of operation programs to be executed by the CPU 40a and map data, a random access memory (RAM) 40c for temporarily storing the results operated by the CPU 40a and data received from the sensors, and a timer 40d (T) for counting the time. The controller makes a reference to the exhaust gas temperature detected by an exhaust gas temperature sensor 25, sends a control signal to the actuator 31 of the intake air throttle valve 30 and adjusts the opening angle of the intake air throttle valve 30 to control the air-fuel ratio and the temperature of the exhaust gas. The controller 40 further sends control signals to the actuators 33, 35 of the exhaust gas passage opening/closing valve 32 and of the bypass opening/closing valve 34 that work as exhaust gas passage change-over means, and opens and closes the exhaust gas passage opening/closing valve 32 and the by-pass opening/closing valve 34, so that the exhaust gas flows through either one of the oxidizing catalyst 20 or the bypass 15.

The device for purifying exhaust gas of the diesel engines according to the illustrated embodiment is constituted as described above. Namely, the controller 40 controls the air-fuel ratio and temperature of the exhaust gas emitted from the cylinders of the engine body 11 and, further, controls the exhaust gas flow passage in the exhaust gas passage 13 to remove the PMs as well as the NOx in the exhaust gas simultaneously. Described below with reference to FIG. 2 are the control operation by the controller 40 and a process in which the exhaust gas is purified by the control operation.

Figure 2:
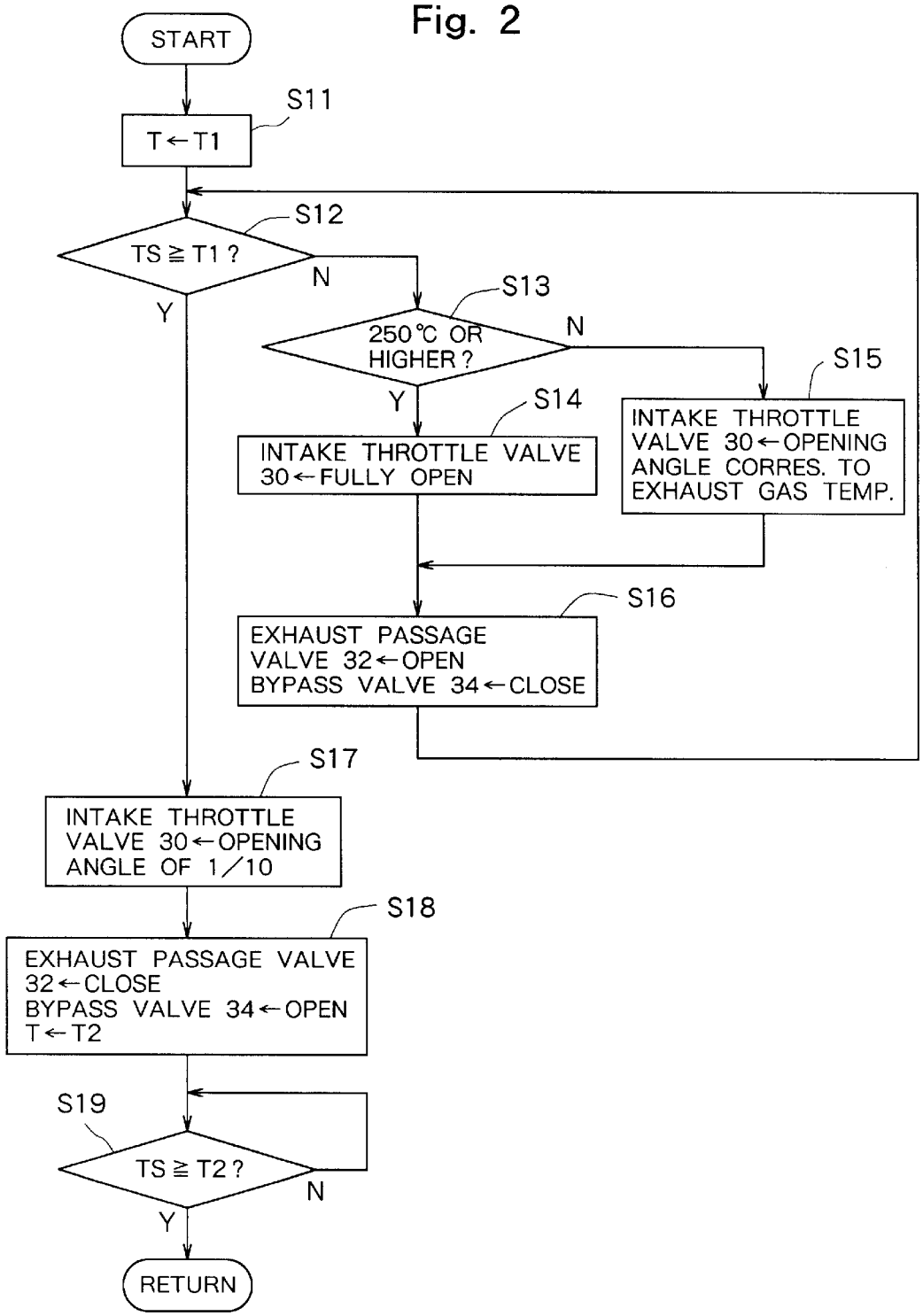
FIG. 2 is a flowchart of a routine executed by a controller for determining the opening angle of an intake air throttle valve and for determining the opening/closing of an exhaust gas passage opening/closing valve and of a bypass opening/closing valve.

FIG. 2 is a flowchart of a routine executed by the controller 40 for determining the opening angle of the intake air throttle valve 30 and for determining the opening/closing of the exhaust gas passage opening/closing valve 32 and of the bypass opening/closing valve 34. The routine of FIG. 2 has been stored in advance in the ROM 40b, and is repetitively executed by the CPU 40a at regular time intervals.

As the diesel engine 10 starts operating and the CPU 40a starts in the routine of FIG. 2, the timer 40d (T) is set to a predetermined time T1 at step S11. The predetermined time T1 is a period of time until the amount of NOx reaches a maximum amount of NOx that can be occluded by the NOx occluding substance 22b, and is set to be from about 1 to about 2 minutes in the case of a diesel engine 10 having a displacement of, for example, 3000 cc. Therefore, a means that counts the passage of time from when the predetermined time T1 has been set works as an Nox occlusion amount detector means for detecting the amount of NOx occluded by the NOx occluding substance 22b.

When the timer 40d (T) is set to the predetermined time T1 at step S11, the controller 40 judges whether the passage of time (TS) after it has been set has reached the predetermined time T1. Immediately after the start of the diesel engine 10, the predetermined period of time T1 has not been reached. Therefore, the controller 40 proceeds to step S13 to judge whether the exhaust gas temperature detected by the exhaust gas temperature sensor 25 has exceeded 250° C. When it is judged that the exhaust gas temperature has exceeded 250° C., the controller 40 proceeds to step S14. At step S14, the controller 40 sends a control signal to the actuator 31 of the intake air throttle valve 30 so as to fully open the intake air throttle valve 30. Accordingly, the exhaust gas assumes a lean air-fuel ratio (e.g., air-fuel ratio of 30).

When it is judged at step S13 that the exhaust gas temperature is not exceeding 250° C., the controller 40 proceeds to step S15 where the opening angle of the intake air throttle valve 30 is determined based on the exhaust gas temperature detected by the exhaust gas temperature sensor 25. Here, the opening angle of the intake air throttle valve 30 is so set that the temperature of the exhaust gas is raised to be not lower than 250° C. in a range where the air-fuel ratio of the exhaust gas does not become rich (e.g., an air-fuel ratio of from 20 to 30). Specifically speaking, the opening angle of the intake air throttle valve 30 is set to be from ½ to full throttle. The ROM 40b stores in advance a two-dimensional map determining a relationship between the temperature of the exhaust gas and the opening angle of the intake air throttle valve 30. The opening angle of the intake air throttle valve 30 is obtained based on the map. The controller 40 sends a control signal to the actuator 31 of the intake air throttle valve 30, so that the intake air throttle valve 30 is opened at an opening angle that corresponds to the temperature of the exhaust gas. Accordingly, the temperature of the exhaust gas rises in excess of 250° C. while the air-fuel ratio of the exhaust gas remains lean.

Next, the controller 40 proceeds to step S16, and sends control signals to the actuator 33 of the exhaust gas passage opening/closing valve 32 and to the actuator 35 of the bypass opening/closing valve 34 so as to open the exhaust gas passage opening/closing valve 32 but to close the bypass opening/closing valve 34. Accordingly, the exhaust gas flows through the oxidizing catalyst 20. The controller, then, returns back to step S12, and repetitively executes step S12 through step S16 until the passage of time (TS) reaches the predetermined time T1 from when the predetermined time T1 has been set. As a result, the exhaust gas having a temperature of not lower than 250° C. and a lean air-fuel ratio flows into the exhaust gas passage 13 to pass through the oxidizing catalyst 20, DPF 21 and NOx occluding/reducing catalyst 22 in this order. Described below is a process for purifying the exhaust gas when the exhaust gas flows in this order. First, as the exhaust gas passes through the oxidizing catalyst 20, the NO in the exhaust gas is oxidized to form $NO_2$.

Next, as the exhaust gas passes through the DPF 21, the PMs in the exhaust gas are trapped by the DPF 21. Here, since the temperature of the exhaust gas is not lower than 250° C., the trapped PMs and the $NO_2$ formed in the oxidizing catalyst 20 produce the chemical reactions, $$NO_2 + C \rightarrow NO + CO$$

$$2NO_2 + 2C \rightarrow N_2 + 2CO_2,$$

whereby the trapped PMs are oxidized (burned) with $NO_2$ into CO or $CO_2$. Then, as the exhaust gas finally passes through the NOx occluding/reducing catalyst 22, the NO that has not been oxidized in the oxidizing catalyst 20 and the NO formed by the above reaction in the DPF 21 are occluded by the NOx occluding substance 22b based on the above-mentioned mechanism of occluding NOx.

According to the illustrated embodiment as described above, when the temperature of the exhaust gas is lower than a predetermined temperature in burning the PMs trapped by the DPF 21 while maintaining the air-fuel ratio of the exhaust gas lean, the intake air throttle valve 30 is narrowed down to such a degree that the air-fuel ratio of the exhaust gas does not become rich, whereby the temperature of the exhaust gas is raised up to above the above-mentioned predetermined temperature. It is, thus, allowed to maintain the exhaust gas at a temperature at which the PMs burn at all times.

Therefore, if the routine of step S12 through up to step S16 is repetitively executed, the PMs in the exhaust gas are continuously removed through the oxidizing catalyst 20 and the DPF 21, and the NOx in the exhaust gas is occluded by the NOx occluding substance 22b.

The amount of NOx occluded by the NOx occluding substance 22b gradually increases with the repetition of the above-mentioned routine, and finally reaches a maximum amount of NOx that can be occluded by the NOx occluding substance 22b. Here, there exists a proportional relationship between the amount of NOx occluded by the NOx occluding substance 22b and the operation time of the diesel engine 10. Therefore, the passage of time (TS) from when the predetermined time T1 has been set, reaches the predetermined time T1 at which the amount of NOx occluded by the NOx occluding substance 22b becomes a maximum. Accordingly, when it is judged at step S12 that the passage of time (TS) has reached the predetermined time T1 during repetitive execution of step S12 through step S16, the controller 40 proceeds to step S17 to end the operation of occluding the NOx in the NOx occluding substance 22b.

At step S17, the controller 40 sends a control signal to the actuator 31 of the intake air throttle valve 30, so that the opening angle of the intake air throttle valve 30 becomes 1/10. Therefore, the air-fuel ratio of the exhaust gas becomes rich. The controller 40, then, proceeds to step S18 and sends control signals to the actuator 33 of the exhaust gas passage opening/closing valve 32 and to the actuator 35 of the bypass opening/closing valve 34 in order to close the exhaust gas passage opening/closing valve 32 and to open the bypass opening/closing valve 34. Therefore, the exhaust gas flows through the bypass 15. At step S18, further, the controller 40 sets the timer 40d (T) to a predetermined time T2. The predetermined time T2 is the one required for releasing the NOx occluded by the NOx occluding substance 22b and reducing the NOx, and is set to be from about 0.1 to about 0.3 second hen the diesel engine has a displacement of, for example, 3000 cc. After the timer 40d (T) is set to the predetermined time T2 at step S18, the controller 40 proceeds to step S19 to judge whether the passage of time (TS) has reached the predetermined time T2 from when the predetermined time T2 has been set. When the passage of time (TS) has not yet reached the predetermined time T2, the controller 40 executes the operation of step S19 again.

So far as it is judged at step S19 that the passage of time (TS) does not yet reach the predetermined time T2 after the predetermined time T2 has been set as described above, the exhaust gas having a rich air-fuel ratio flows into the exhaust gas passage 13 to pass through the bypass 15, DPF 2 and NOx occluding/reducing catalyst 22 in this order. Described below is the process for purifying the exhaust gas that flows as described above. As the exhaust gas passes through the bypass 15 and then, through the DPF 21, the PMs in the exhaust gas are trapped by the DPF 21. Though, when the opening angle of the intake air throttle valve 30 is narrowed down to 1/10 to enrich the air-fuel ratio of the exhaust gas, the fuel does not completely burn in the combustion chambers of the engine body 11 due to the lack of air and black smoke increases in the exhaust gas, the black smoke is removed by the DPF 21. Then, as the exhaust gas passes through the NOx occluding/reducing catalyst 22, the NOx occluded by the NOx occluding substance 22b is released therefrom and is reduced into $N_2$ with HC and CO which serve as reducing agents, in the exhaust gas. While the NOx is reduced, the HC and CO are oxidized into $H_2O$ and $CO_2$ simultaneously.

Thus, in the illustrated embodiment, when the NOx is reduced in the NOx occluding/reducing catalyst 22 by enriching the air-fuel ratio of the exhaust gas, the exhaust gas is not supplied into the oxidizing catalyst 20 but is supplied into the bypass 15. Therefore, the HC and CO in the exhaust gas that serve as reducing agents at the time of reducing the NOx released from the NOx occluding substance 22b, flow into the NOx occluding/reducing catalyst 22 without being oxidized into $H_2O$ and $CO_2$ in the oxidizing catalyst 20. Accordingly, since the NOx released from the NOx occluding substance 22b is reduced to $N_2$ with HC and CO, the NOx is not emitted into the atmosphere without being reduced.

Here, the exhaust gas having a rich air-fuel ratio does not flow through the oxidizing catalyst 20 and hence, the NO in the exhaust gas is not oxidized into $NO_2$. Therefore, the PMs trapped by the DPF 21 accumulate thereon without being burned. As described above, however, the time until the NOx occluded by the NOx occluding substance 22b is released and is reduced is very shorter, i.e., the predetermined time T2 is very shorter than the time until the amount of NOx occluded by the NOx occluding substance 22b reaches its maximum amount of occlusion, i.e., very shorter than the predetermined time T1. Therefore, the PMs not burned are burned when the exhaust gas is leaned again so as to have a lean air-fuel ratio and is permitted to flow through the oxidizing catalyst 20.

As the routine of step S17 through step S19 are repetitively executed as described above, the amount of NOx occluded by the NOx occluding substance 22b gradually decreases and, finally, almost no NOx exists in the NOx occluding substance 22b. Here, there exists a proportional relationship between the amount of NOx that is released from the NOx occluding substance 22b and reduced and the operation time of the diesel engine 10, like when the NOx is occluded. In the illustrated embodiment, therefore, it is so judged that the NOx occluded by the NOx occluding substance 22b is all released and reduced when the predetermined time T2 has passed from the start of release and reduction of NOx from the NOx occluding substance 22b. When it is judged at step S19 that the predetermined period T2 has passed, the controller 40 ends the routine to terminate the operation for releasing and reducing the NOx from the NOx occluding substance 22b. The controller 40, then, starts again the routine from step S11 and the NOx occluding substance 22b starts occluding the NOx.

The intake air throttle valve 30 is used not only for controlling the air-fuel ratio and the temperature of the exhaust gas but also for stopping the diesel engine 10 in combination with, for example, the fuel injection device that is not shown. Further, the exhaust gas passage opening/closing valve 32, too, can be used not only for changing over the flow of the exhaust gas but also, upon making a structure to allow continuously controlling the opening angle of the valve, for example, for promoting the warming-up at the cold start of the diesel engine 10, or as an exhaust gas brake.

In the foregoing is described the present invention based on the illustrated embodiment to which only, however, the invention is in no way limited. For example, the air-fuel ratio of the exhaust gas may be controlled by a so-called post injection in which a very small amount of fuel is injected into the combustion chambers in the latter half of the combustion stroke (e.g., near 60° after the compression top dead center) or by the EGR. Further, the exhaust gas passage change-over means may be constituted by a three-way valve provided in a portion (13a in FIG. 1) where the bypass is connected to the upstream side of the oxidizing catalyst to selectively change the flow of the exhaust gas to either the oxidizing catalyst or the bypass. Further, as the NOx occlusion amount detector means for detecting the amount of NOx occluded by the NOx occluding substance, there may be used a fuel injection amount integrating means for integrating the amount of fuel injected into the combustion chambers, or an Nox sensor may be disposed in the exhaust gas passage on the downstream side of the NOx occluding/reducing catalyst to detect the amount of NOx in the exhaust gas and to use the value detected by the NOx sensor. Further, the time until the maximum amount of NOx that can be occluded by the NOx occluding substance is reached or the time until the NOx occluded by the NOx occluding substance is released and reduced, may be suitably changed depending upon a type of the NOx occluding substance or the catalytically active component and the amount thereof that is carried. Further, a relationship among the engine rotational speed, engine load and the temperature of the exhaust gas may be stored in the form of a map in the controller, and the temperature of the exhaust gas may be obtained from the map. Namely, the invention may be realized in any form of embodiment provided it includes the requirements that constitute the present invention and exhibits the same action.

According to the present invention, there is provided a device for purifying exhaust gas of diesel engines, in which an oxidizing catalyst, a DPF and an Nox occluding/reducing catalyst are successively disposed in an exhaust gas passage of the diesel engine from the upstream side thereof, the device for purifying exhaust gas of diesel engines comprising a bypass that bypasses the oxidizing catalyst, an exhaust gas passage change-over means for so changing-over the exhaust gas as to flow into either the oxidizing catalyst or the bypass, an air-fuel ratio control means for controlling the air-fuel ratio of the exhaust gas, an NOx occlusion amount detector means for detecting the amount of NOx occluded by the NOx occluding substance, and a controller for controlling the air-fuel ratio control means and the exhaust gas passage change-over means based on a detection signal from the NOx occlusion amount detector means, wherein the controller controls the air-fuel ratio control means so that the exhaust gas will have a lean air-fuel ratio and controls the exhaust gas passage change-over means so that the exhaust gas will flow through the oxidizing catalyst when the amount of NOx occluded by the NOx occluding substance does not reach a predetermined value, and controls the air-fuel ratio control means so that the exhaust gas will have a rich air-fuel ratio and controls the exhaust gas passage change-over means so that the exhaust gas will flow through the bypass when the amount of NOx occluded by the NOx occluding substance has exceeded the predetermined value. Accordingly, PMs and NOx are reliably removed.

What I claim is:

1. A device for purifying exhaust gas of diesel engines, in which an oxidizing catalyst, a diesel particulate filter for trapping particulate matters contained in the exhaust gas, and an NOx occluding/reducing catalyst comprising an NOx occluding substance and a catalytically active component, are successively arranged in an exhaust gas passage of the diesel engine from the upstream side thereof, said device for purifying exhaust gas of diesel engines comprising:

a bypass that connects the upstream side of said oxidizing catalyst with the downstream side thereof in said exhaust gas passage to bypass said oxidizing catalyst;

an exhaust gas passage change-over means for changing-over the exhaust gas flow into either said oxidizing catalyst or said bypass;

an air-fuel ratio control means for controlling the air-fuel ratio of the exhaust gas;

an NOx occlusion amount detector means for detecting the amount of NOx occluded by said NOx occluding substance; and a controller for controlling said air-fuel ratio control means and said exhaust gas passage change-over means based on a detection signal from said NOx occlusion amount detector means;

wherein said controller controls said air-fuel ratio control means so that the exhaust gas will have a lean air-fuel ratio and controls said exhaust gas passage change-over means so that the exhaust gas will flow through said oxidizing catalyst when the amount of NOx occluded by said NOx occluding substance does not reach a predetermined value, and controls said air-fuel ratio control means so that the exhaust gas will have a rich air-fuel ratio and controls said exhaust gas passage change-over means so that the exhaust gas will flow through said bypass when the amount of NOx occluded by said NOx occluding substance exceeds the predetermined value.

* * * * *